United States Patent [19]

Lamond et al.

[11] 4,282,199
[45] Aug. 4, 1981

[54] CARBON BLACK PROCESS

[75] Inventors: Trevor G. Lamond; Peter Aboytes, both of Borger, Tex.

[73] Assignee: J. M. Huber Corporation, Locust, N.J.

[21] Appl. No.: 124,010

[22] Filed: Feb. 25, 1980

[51] Int. Cl.$^3$ .......................... C01B 31/02; C09C 1/48
[52] U.S. Cl. .................................. 423/461; 423/450; 423/460; 34/10
[58] Field of Search ............... 423/445, 449, 450, 455, 423/456, 458, 460, 461; 34/10

[56] References Cited

U.S. PATENT DOCUMENTS

| | | | |
|---|---|---|---|
| 2,117,822 | 5/1938 | Pehrson et al. | 34/10 |
| 3,282,577 | 11/1966 | Cottle | 422/145 |
| 3,309,780 | 3/1967 | Goins | 34/10 |
| 3,513,560 | 5/1970 | Lamare | 34/10 |
| 3,740,861 | 6/1973 | Myers | 34/10 |

FOREIGN PATENT DOCUMENTS 164754  8/1955  Australia ................................ 423/450

*Primary Examiner*—O. R. Vertiz
*Assistant Examiner*—Gregory A. Heller
*Attorney, Agent, or Firm*—Ernest A. Schaal; Harold H. Flanders

[57] ABSTRACT

The tail gas generated by the carbon black process can be used as a source of fuel for drying carbon black without adversely affecting the product properties of the end product if the dried carbon black is heat treated using a fuel free of sulfur and nitrogen compounds.

6 Claims, 1 Drawing Figure

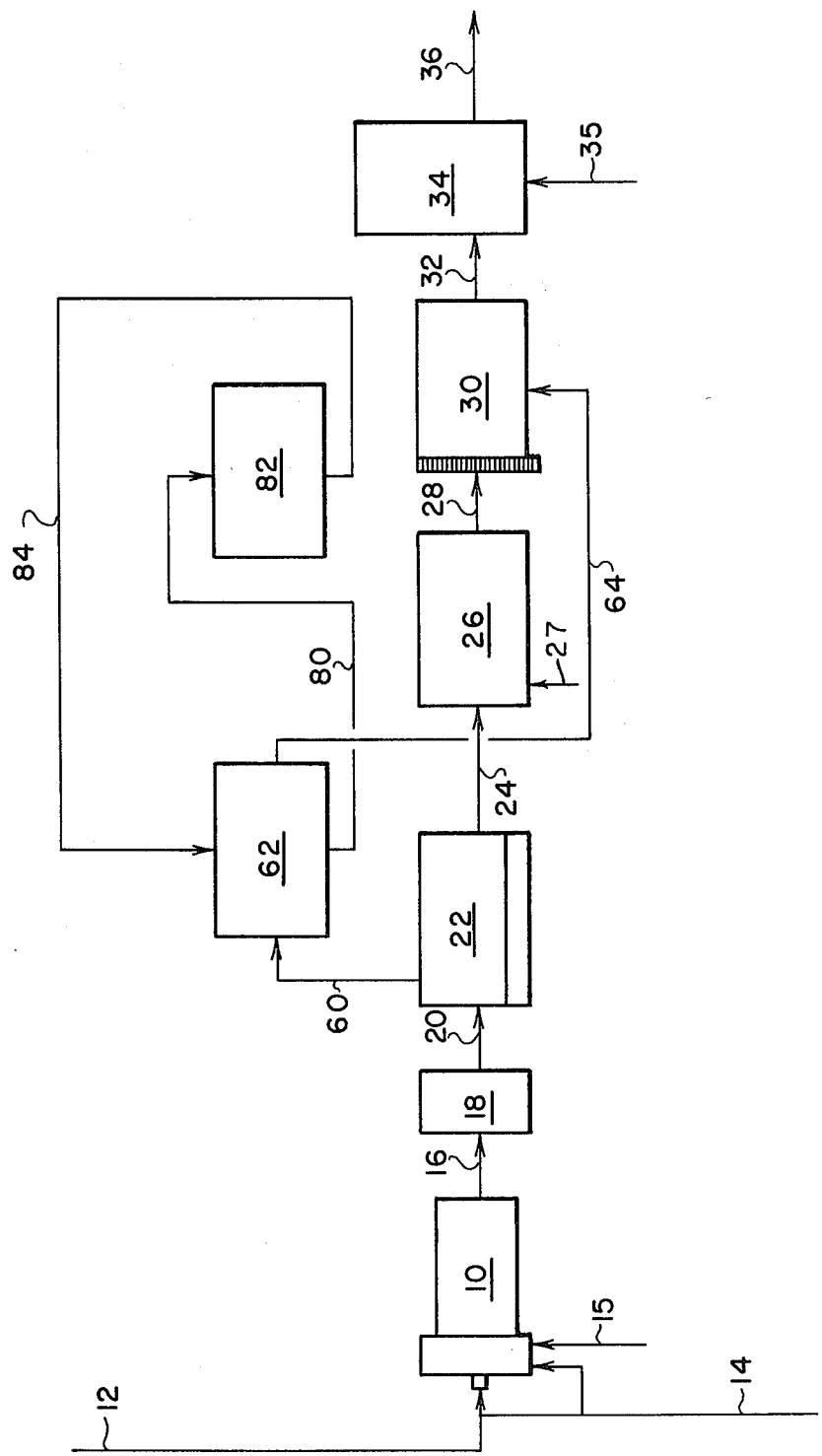

CARBON BLACK PROCESS

BACKGROUND OF THE INVENTION

In the traditional furnace carbon black process, hydrocarbon feedstock is decomposed to carbon black and tail gas. The tail gas has combustible components (e.g. carbon monoxide and hydrogen), and non-combustible components (e.g. nitrogen, carbon dioxide and water). The carbon black is filtered from the tail gas and is dried in a natural gas fired rotary dryer with the combustion gases produced by burning the natural gas used as an inert atmosphere for the carbon black so that the carbon black will not oxidize during drying. The tail gas filtered from the carbon black is vented to the atmosphere.

The rising price of natural gas has prompted carbon black manufacturers to try to find ways of utilizing the heat content of tail gas. In one process, the filtered tail gas is dehumidified to increase its heat content and is used to replace at least some of the natural gas used to dry the carbon black. This results in significant savings, but the carbon black so produced is no longer useful in certain applications. For instance, carbon black dried using the waste heat from the tail gas caused bubbles in the low density polyethylene extrudants containing such carbon blacks.

SUMMARY OF THE INVENTION

Accordingly, it is an object of this invention to provide a new and highly effective product which overcomes the deficiencies of the prior art as described above.

It is a further object of this invention to develop a process using the tail gas generated by the carbon black process as a source of fuel for drying carbon black which does not adversely affect the product properties of the resulting carbon black.

Other objects and a fuller understanding of this invention may be had by referring to the following description and claims taken in conjunction with the drawing.

The present invention overcomes the deficiencies of the prior art and achieves its objectives by producing carbon black and tail gas by the decomposition of a hydrocarbon feedstock, passing the carbon black and the tail gas into a filter, filtering the tail gas from the carbon black in the filter, passing the tail gas from the filter to a dehumidifier, cooling and dehumidifying the tail gas in the dehumidifier by spraying water onto the tail gas to reduce the moisture content of the tail gas, passing the tail gas from the dehumidifier to a drying means, passing the carbon black from the filter to a pelletizing means, pelletizing the carbon black in the pelletizing means, passing the carbon black from the pelletizing means to the drying means, using the tail gas as a fuel to dry the carbon black in the drying means, passing the carbon black from the drying means to a heat treatment means, heat treating the carbon black in the heat treatment means using a fuel free of sulfur and nitrogen compounds, and removing the carbon black from the heat treatment means. The heat treatment means is operated at a higher temperature than the drying means. Preferably when the tail gas is cooled in the dehumidifier, it is cooled to a temperature of below 60 degrees Celsius and the water is passed from said dehumidifier, sprayed in a cooling pond and recycled from the cooling pond back to the dehumidifier. Preferably the drying means is a rotary dryer with a carbon black temperature at the outlet of from 110 to 300 (more preferably 125 degrees Celsius) degrees Celsius. Preferably the heat treatment means is a fluidized bed operating at a temperature of between 175 and 350 degrees Celsius (more preferably 260 degrees Celsius) for 20 minutes using natural gas as the fuel.

BRIEF DESCRIPTION OF THE DRAWING

In order to facilitate the understanding of this invention, reference will now be made to the appended drawing. The drawing should not be construed as limiting the invention but is exemplary. The drawing is a block diagram of one embodiment of the present invention.

DESCRIPTION OF THE PREFERRED EMBODIMENTS

In its broadest aspect, the present invention involves producing carbon black and tail gas by the decomposition of a hydrocarbon feedstock, filtering the tail gas from the carbon black, dehumidifying the filtered tail gas, using the dehumidified tail gas as a fuel in a drying means to dry the carbon black and heat treating the carbon black in a heat treatment means which uses a fuel free of sulfur and nitrogen compounds.

In a preferred embodiment of the present invention, a hydrocarbon feedstock is decomposed to carbon black and tail gas, the tail gas is filtered from the carbon black, dehumidified, and used as a fuel in a rotary dryer to dry the carbon black at a carbon black outlet temperature of 125 degrees Celsius, then the carbon black is dried in a natural gas fired fluidized bed at a temperature of 260 degrees Celsius for 20 minutes. This embodiment is shown in more detail in the drawing.

Referring to the drawing which is a specific embodiment of the present invention, a furnace carbon black reactor 10 is provided with a hydrocarbon feedstock line 12, an air-supply line 14, a first natural gas fuel line 15 and an effluent smoke line 16. In carbon black reactor 10, a hydrocarbon feedstock is decomposed to an effluent smoke consisting of carbon black and tail gas. The effluent smoke passes through effluent smoke line 16 to a quench tower 18 where the effluent smoke is quenched and the quenched effluent passes through quench tower discharge line 20 to a carbon black collecting system including bag filter 22. (An example of a suitable carbon black collecting system is shown in U.S. Pat. No. 3,438,732 which is hereby incorporated by reference.) Carbon black separated from the effluent smoke in bag filter 22 is recovered and passed through bag filter carbon black discharge line 24 to pinmixer 26 where it is agglomerated in the presence of water which is supplied through water line 27 to form pellets. The carbon black pellets formed in pinmixer 26 are conveyed through pinmixer discharge line 28 to rotary dryer 30 which uses dehumidified tail gas as a fuel to dry the carbon black pellets to a temperature of 125 degrees Celsius. The dried carbon black is passed through rotary dryer discharge line 32 to fluidized bed 34 which uses natural gas as a fuel to heat treat the carbon black pellets at a temperature of 260 degrees Celsius for 20 minutes. The natural gas is supplied to a fluidized bed through second natural gas fuel line 35. The treated carbon black pellets are then delivered through fluidized bed discharge line 36 to bagging apparatus or to storage.

The tail gas which is filtered from the carbon black in bag filter 22 is passed through bag filter tail gas discharge line 60 to dehumidifier 62 where the tail gas is cooled to a temperature of below 60 degrees Celsius to reduce the moisture content of the tail to less than 1% by spraying water onto the tail gas. The dehumidified tail gas is passed through dehumidifier discharge line 64 to rotary dryer 30 where the tail gas is used as a fuel to dry carbon black pellets.

In a conventional dehumidifier, water which is sprayed onto the tail gas in dehumidifier 62 is passed through water outlet line 80 and is sprayed in cooling pond 82 to cool the water. This water is then recycled through water inlet line 84 to dehumidifier 62.

The carbon black produced by the present invention is particularly useful as an ingredient in low density polyethylene extrudents.

An essential element of the present invention is that there be a heat treatment means in the process. In the drying means the carbon black is dried using dehumidified tail gas as a fuel. The carbon black is then heat treated in a heat treatment means which uses as a fuel a fuel free of sulfur and nitrogen compounds. Both the drying means and the heat treatment means are essential if one is to obtain an inexpensive carbon black useful in polymeric compositions.

While the applicants do not wish to be bound by any particular theory as to how their invention works, it is thought that the adverse effects on product properties of carbon blacks dried with dehumidified tail gas noted in the past are due to the presence of polar gases such as oxides of sulfur and nitrogen contained in the tail gas which contaminates the surface of the carbon black. It is thought that the heat treatment means produces its beneficial effect by removing these contaminants from the surface of the carbon black.

The tail gas is dehumidified so that it can sustain combustion. If the tail gas is not dehumidified it is too lean to burn by itself. If it is not dehumidified one must supplement the tail gas with another fuel such as methane, hydrogen or carbon black oil. The tail gas will sustain combustion by itself if it is dehumidified.

One conventional method of dehumidifying the filtered tail gas is to spray water onto the tail gas in a dehumidifier to cool the tail gas to a temperature of below 60 degrees Celsius. A dehumidifier works because the ability of the tail gas to retain water is reduced as the temperature of the tail gas decreases. The water that is sprayed into the dehumidifier is heated by contact with the tail gas, so the heated water is passed from the dehumidifier and is cooled by spraying it into a cooling pool so that it can be recycled to the dehumidifier as a source of cooling water.

The carbon black is formed into pellets prior to passing it into the drying means to increase the bulk density and flowability of the product and to cut down on dust problems. Agglomeration techniques useful in the present invention include the use of pinmixers, pelletizing drums, pelletizing disks, pelletizing cones and multicone pelletizers. In a preferred embodiment, the carbon black is agglomerated in a pinmixer. An example of a suitable pinmixer is disclosed in U.S. Pat. No. 3,528,785 which is hereby incorporated by reference.

The dehumidified tail gas is used in the drying means to dry carbon black. The dehumidified tail gas can be either the sole source of fuel for the drying means or it can be used in conjunction with some other fuel such as natural gas. In one preferred embodiment, natural gas is used as a fuel to fire the drying means during start up, then as the dryer temperature reaches equilibrium, all of the natural gas is replaced with dehumidified tail gas.

In one embodiment the drying means is a rotary dryer with a carbon black temperature at the outlet of about 125 degrees Celsius.

After the carbon black has been dried in the drying means it is passed from the drying means to the heat treatment means and is heat treated at a higher temperature than that used in the drying means. The temperature of the heat treatment means must be higher than that of the drying means in order to deabsorb the contaminates on the surface of the carbon black. No tail gas is used as a fuel in the heat treatment means. Instead, traditional fuels are used such as natural gas, hydrogen and carbon monoxide. The purpose of the heat treatment step is to remove contaminants that may have a harmful effect on the product properties of the carbon black. Tail gas cannot be used as a fuel in the heat treatment means because it would add contaminanants instead of removing them. Natural gas is a preferred fuel because it is readily available.

The heat treatment means is preferably operated at a temperature of between 175 and 350 degrees Celsius, more preferably at a temperature of about 260 degrees Celsius. Preferably the heat treatment means is a fluidized bed so that there will be maximum contact between the carbon black and the hot gases. The use of fluidized beds for processes dealing with carbonous material is outlined in U.S. Pat. No. 1,984,380 which is hereby incorporated by reference.

EXAMPLES

The invention will be further illustrated by the following examples which set forth particularly advantageous method and composition embodiments. While the examples are provided to illustrate the present invention, they are not intended to limit it.

In Examples I through IX, a hydrocarbon oil feedstock was decomposed in a carbon black reactor to an effluent smoke consisting of carbon black and tail gas. The effluent smoke was quenched and passed into a bag filter. The carbon black separated from the effluent smoke in the bag filter, was recovered and passed to a pinmixer where it was agglomerated to form pellets. The carbon black pellets were passed to a rotary dryer which used tail gas as a fuel to dry the pellets at a temperature of 125 degrees Celsius. The tail gas used as a fuel in the rotary dryer was first passed from the bag filter to a dehumidifier where it was cooled to a temperature of below 60 degrees Celsius by spraying water onto the tail gas, then the tail gas was passed from the dehumidifier to the rotary dryer. The water used to cool the tail gas in the dehumidifier was passed from the dehumidifier and was sprayed into a cooling pond, then it was recycled from the cooling pond back to the dehumidifier.

Examples I through IX were dried in a natural gas fired fluidized bed at a temperature of from 175 to 260 degrees Celsius for a residence time of from 5 to 20 minutes. The temperature, residence time and degree of porosity is given in the following table.

The degree of porosity in an ethylene ethyl acetate copolymer/carbon black compound when extruded under simulated field conditions was determined by the following procedures: A one pound sample of compound strips was dried in an air circulating oven at 60 degrees Celsius for eight hours. This sample was then removed from the oven and extruded immediately, using a Brabender extruder set up for rod extrusion with the temperature at both the front and the rear of the extruder being 200 degrees Celsius, the screw speed being 50 rpm, only a breaker plate and a 0.200 inch rod die being used. After the extrusion had reached equilibrium, twenty rod samples were collected, each being approximately 8 inches long. After they have cooled, the twenty rod samples were cut in half with a sharp single-edge razor blade and the twenty sections were examined for porosity. The number of voids seen by an unaided eye were counted on twenty of the cut surfaces.

Two control examples which were not further treated in a second drying means were tested for degree of porosity. The first control example (A) had 71 voids and the second control example (B) had 55 voids. Neither control example had an acceptable degree of porosity.

| Example | Temperature (degrees Celsius) | Residence Time (min) | Degree of Porosity (voids) |
|---------|-------------------------------|----------------------|----------------------------|
| I       | 175                           | 5                    | 29                         |
| II      | 175                           | 10                   | 37                         |
| III     | 175                           | 20                   | 18                         |
| IV      | 205                           | 5                    | 24                         |
| V       | 205                           | 10                   | 23                         |
| VI      | 205                           | 20                   | 16                         |
| VII     | 260                           | 5                    | 23                         |
| VIII    | 260                           | 10                   | 12                         |
| IX      | 260                           | 20                   | 5                          |

Note that the degree of porosity usually decreases as the temperature and residence time increases. Also note that all of the examples that were dried in the fluidized bed had a degree of porosity less than that of the control examples. Example IX which was dried in the fluidized bed at a temperature of 260 degrees Celsius for 20 minutes had a particularly low degree of porosity.

In Examples X through XII, a hydrocarbon oil feedstock is decomposed in a carbon black reactor to an effluent smoke consisting of carbon black and tail gas. The effluent smoke is quenched and passed into a bag filter. The carbon black separated from the effluent smoke in the bag filter, is recovered and passed to a pinmixer where it is agglomerated to form pellets. The carbon black pellets are passed to a rotary dryer which uses tail gas as a fuel to dry the pellets. The pellets in Examples X, XI and XII are dried at a temperature of 110, 200 and 300 degrees respectively. The tail gas used as a fuel in the rotary dryer is first passed from the bag filter to a dehumidifier where it is cooled to a temperature of below 60 degrees Celsius by spraying water onto the tail gas, then the tail gas is passed from the dehumidifier to the rotary dryer. The dried carbon black is passed from the rotary dryer to a natural fired fluidized bed. Example X is heat treated in the fluidized bed at a temperature of 175 degrees Celsius for 40 minutes. Example XI is heat treated in the fluidized bed at a temperature of 300 degrees Celsius for 20 minutes. Example XII is heat treated in the fluidized bed at a temperature of 350 degrees Celsius for 5 minutes.

Thus, in operation, the tail gas generated by the carbon black process can be used as a source of fuel for drying carbon black without adversely affecting the product properties of the resulting carbon black if said carbon black is heat treated in a heat treatment means which uses a fuel free from sulfur and nitrogen compounds.

While the present invention has been described with reference to specific embodiments, this application is intended to cover those various changes and substitutions which may be made by those skilled in the art without departing from the spirit and scope of the appended claims.

We claim:

1. In a method of using the tail gas generated by the production of carbon black comprising:
    (a) producing carbon black and tail gas by the decomposition of a hydrocarbon feedstock;
    (b) filtering said tail gas from said carbon black;
    (c) dehumidifying said filtered tail gas; and
    (d) using said dehumidified tail gas as a fuel in a drying means to dry said carbon black; the improvement comprising heat treating said carbon black in a heat treatment means, wherein said heat treatment means uses as a fuel, a fuel free of sulfur and nitrogen compounds; and wherein said heat treatment means operates at a higher temperature than the drying means.

2. A method according to claim 1 wherein said heat treatment means operates at a temperature of between 175 and 350 degrees Celsius.

3. A method according to claim 2 wherein said heat treatment means operates at a temperature of about 260 degrees Celsius.

4. A method according to claim 1 wherein said heat treatment means is a fluidized bed.

5. A method according to claim 1 wherein natural gas is used as the fuel for the heat treatment means.

6. A method of using the tail gas generated by the production of carbon black comprising:
    (a) producing carbon black and tail gas by the decomposition of a hydrocarbon feedstock;
    (b) passing said carbon black and said tail gas into a filter;
    (c) filtering said tail gas from said carbon black in said filter;
    (d) passing said tail gas from said filter to a dehumidifier;
    (e) cooling said tail gas in said dehumidifier to a temperature of below 60 degrees Celsius by spraying water onto said tail gas to reduce the moisture content of said tail gas to less than 1%;
    (f) passing said tail gas from said dehumidifier to a rotary dryer;
    (g) passing said carbon black from said filter to a pinmixer;
    (h) forming carbon black pellets in said pinmixer;
    (i) passing said carbon black pellets to said rotary dryer;
    (j) using said tail gas as a fuel in said rotary dryer to dry said carbon black pellets to a temperature of about 125 degrees Celsius;
    (k) passing said carbon black pellets from said rotary dryer to a natural gas fired fluidized bed;
    (l) heat treating said carbon black pellets in said fluidized bed at a temperature of about 260 degrees Celsius for about 20 minutes; and,
    (m) removing said carbon black from said fluidized bed.

* * * * *